June 3, 1924.
G. G. BROWNE
WORM ROLLING MACHINE
Filed June 22, 1921
1,496,116
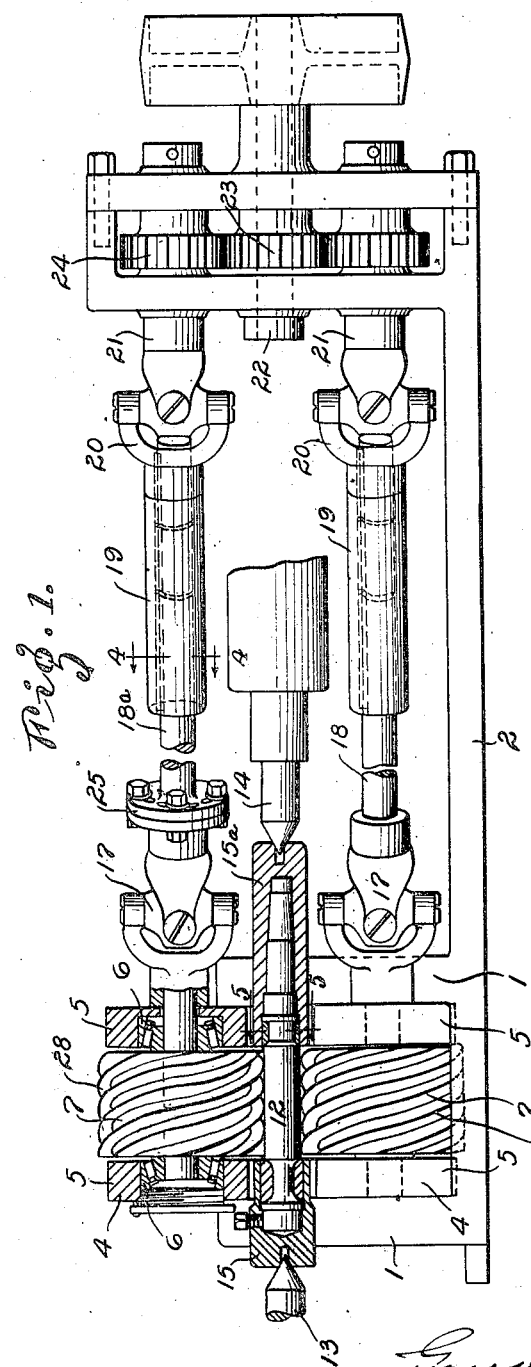
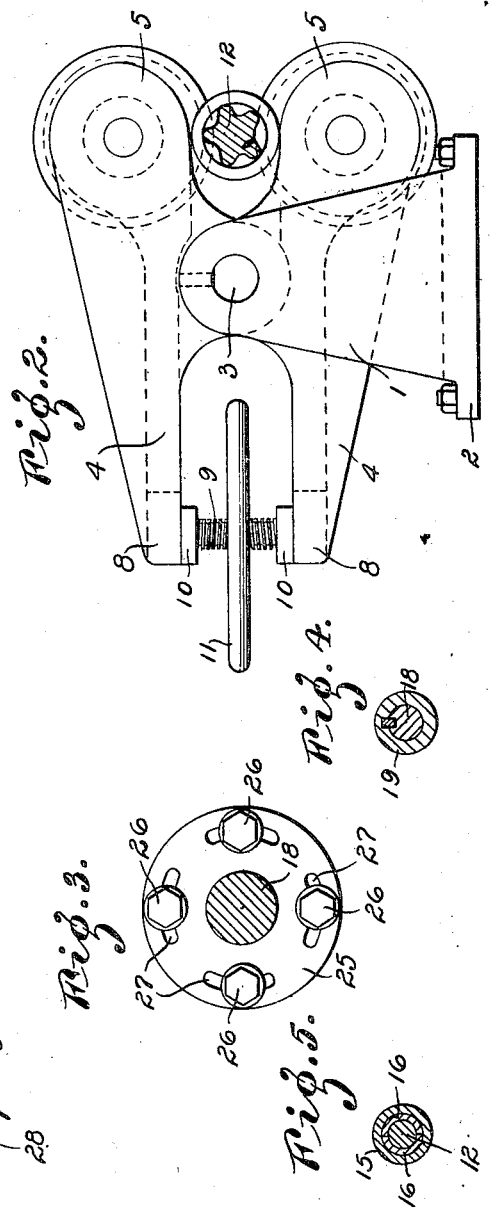
Inventor:
Gouverneur G. Browne,
by
his Attorneys.

Patented June 3, 1924.

1,496,116

UNITED STATES PATENT OFFICE.

GOUVERNEUR G. BROWNE, OF WINCHESTER, NEW HAMPSHIRE.

WORM-ROLLING MACHINE.

Application filed June 22, 1921. Serial No. 479,471.

*To all whom it may concern:*

Be it known that I, GOUVERNEUR G. BROWNE, a citizen of the United States, and a resident of Winchester, in the county of Cheshire and State of New Hampshire, have invented a new and useful Improvement in Worm-Rolling Machines, of which the following is a specification.

My invention relates to the manufacture of worms for worm gearing and has for its principal objects to devise a machine for rolling such worms and other articles.

The invention consists principally in a machine having rotary, helically ribbed formers disposed parallel to each other and adapted to operate on a bar rotatably held between and parallel to them. The invention further consists in the parts and combinations of parts hereinafter described and claimed.

In the drawings which form part of this specification and wherein like reference numerals indicate like parts wherever they occur, Fig. 1 is an elevation of a worm rolling machine embodying my invention, certain parts being shown in section;

Fig. 2 is a side elevation thereof,

Fig. 3 is a detail view of the coupling that permits indexing of the formers,

Fig. 4 is a sectional view on the line 4—4 of Fig. 1; and

Fig. 5 is a sectional view on the line 5—5 of Fig. 1.

My machine comprises a pair of spaced pedestals or uprights 1 mounted on a suitable base 2 and supporting a horizontal member 3 that constitutes a common fulcrum or pivot support for heavy levers 4, disposed one above the other. Each lever 4 has one end bifurcated and the two forks 5 are provided with horizontally alined journal bearings 6, preferably roller bearings adapted to prevent endwise movement, and in said alined bearings 6 are mounted the journals of a rotary former or matrix 7. The former are mounted on the adjacent ends of the levers and their axes are equidistant from the common fulcrum or axis of oscillation of the levers. The opposite ends 8 of said levers are connected by a screw 9 that is oppositely threaded at its respective ends which engage threaded members 10 provided therefor on said levers and so mounted as to be capable of accommodating themselves to angular variations in the positions of the levers 4. This screw 9 is provided with means for turning it, as for instance, a hand wheel 11, and thereby actuating the levers 4 to make said formers 7 approach or withdraw from each other.

As stated above, the axes of the two formers are horizontal and equidistant from the axis of their common fulcrum; and the work 12 is mounted horizontally midway between said formers. For this purpose, a head stock 13 and a tail stock 14 are mounted on the pedestals or other portions of the frame of the machine in alinement and relatively movable and otherwise adapted to support the chucks 15 and 15ª in which the work is held and hold the work against thrust endwise, as in an ordinary lathe.

The ends of the work are reduced and may have the shape they will be required to have when the worm is ready for use. Preferably hollow chucks 15 and 15ª are provided for the work, the bores of which make a close fit with the respective ends of the work. Split rings 16 are provided to fill any gap between the ends of the work and the bore of the chuck. As the ends of the work are firmly held in the chucks displacement of the work under the pressure of the formers is prevented.

By this arrangement, the turning of the screw 9 (which, in practice, will preferably be done by automatic mechanism in place of the hand wheel represented) has the effect of swinging the formers 7 toward and from each other in the same circular arc on opposite sides of the work without disturbing their parallel relation; so that each former constitutes both a means for impressing the work and a means for supporting the work against the thrust of the opposite former and thus it preserves the proper alinement of the work.

One end of each former 7 is provided with a universal joint 17 one of which is connected to a link 18 and the other to a link 18ª. Each link 18 and 18ª is telescopically mounted in a hollow shaft 19 and is keyed therein so as to rotate therewith and to be free to move longitudinally thereof. Each of said hollow shafts 19 in turn, is connected by a universal joint 20 to a countershaft 21 mounted on the frame of the machine. There are two counter-shafts 21, one for each former 7, and they are disposed on opposite sides of the main driving shaft 22 which is provided with a gear 23 that meshes with gears 24 on the respective countershafts 21, the last mentioned gears 24 being of the same size in order to give the two formers 7 the same velocity of rotation.

In order to properly index the formers 7, that is, give them the proper circumferential adjustment with relation to each other, the link 18a is divided into two parts and a coupling 25 is interposed between the abutting ends thereof. This coupling 25 comprises abutting flanges that are perforated in alinement to receive locking bolts 26, and one series of perforations is made in the form of circular arcs 27 to permit limited rotary movement of the former 7 independently of the driving mechanism and thus permit adjustment of one former relative to the other.

The two formers 7 are counterparts. When designed for rolling a worm, each former is made with a series of counterpart helical ribs 28 whose pitch circle is some multiple, preferably five, of the pitch circle of the worm desired. By virtue of this mathematical relation and the fact that the work is rotated by the formers, their contacting surfaces will rotate at the same speed but the work will rotate a definite multiple of times for each rotation of the former. When the ratio of rotations of the work relative to the former is five to one, and considering a single revolution of a single rib on the former, it would (if operating alone) impress in the work a continuous helical channel with five complete turns. As the ribs of a former are equidistant and parallel, and equal in number to the above specified ratio of the former to the work, each of said ribs will in turn register with the channel impressed in the work by the next preceding rib and will itself deepen such channel and thus carry on the work of the preceding rib; so that, although there are multiple ribs in each former, they form only a single helical channel or depression in the work. What is said above in regard to one former is true of the other former also; but as the second former operates on the opposite side of the work, the formers are rotated in opposite directions, so that, when the formers are properly indexed relative to each other, the ribs of one former will register with and deepen the channel impressed in the work by the ribs of the opposite former. Otherwise expressed, the several ribs of each former work simultaneously on different portions of the same helical channel, and the ribs of the second former simultaneously operate on the intervening sections of said channel. It is noted that on account of the multiplicity of places where the work is being operated on simultaneously to produce a single channel (or thread), comparatively little displacement of the metal is effected at any one place at any one time, so that the metal has ample time to accommodate itself by plastic flow to the new position required of it. It is also noted that the metal between successive turns of the helical channel in the work constitutes the thread of the worm, and this thread is supported on opposite sides throughout the operation by successive ribs, which shape the sides of the thread, while the circumference or periphery of the thread is shaped by the body of the former between ribs, which portion bears radially against the displaced or flowed metal that constitutes the thread of the worm. It is also noted that the formers tend to displace the work in opposite directions at a plurality of points and thus counteract each other, if the formers are of the design shown in the drawings. This advantage is lost if the formers are made right and left-handed respectively and rotated in the same direction.

In practice, the work stock will be plastic metal, and the operation will ordinarily be a hot-rolling operation on metal that has been heated to a fairly plastic condition.

The worm may be formed from a tube, instead of a solid bar, in which case the bore of the tube must be closed by a bar or mandrel to prevent the metal from being displaced inwardly.

It is obvious that numerous changes may be made without departing from my invention and I do not wish to be limited to the precise construction shown.

What I claim is:

1. A machine for rolling worms for worm gearing or the like, comprising rotary formers, means for rotatably supporting a metal blank between said formers and for preventing endwise movement or stretching of the blank, the axes of said formers and of said blank being parallel, and means for rotating said formers at the same speed and in opposite directions.

2. A machine for rolling worms or the like, comprising rotary formers, hollow chucks adapted to receive the ends of a metal blank for rotatably supporting said blank between said formers and for preventing endwise movement or stretching of the blank, the axes of said formers and of said blank being parallel, means for rotating said formers, and means for bringing said formers closer together and spreading them apart.

3. In a machine for rolling worms, that is provided with means for rotatably supporting the work stock, a pair of rolls rotatably mounted on opposite sides of the stock and provided with counterpart helical ribs, the diameter of said ribs being a definite multiple of the diameter of the finished worm, and the number of ribs on each roll being the same as said multiple, and means for feeding said rolls toward each other while in engagement with the work.

4. In a machine for rolling worms, that is provided with means for rotatably supporting the work stock, a pair of rotatable rolls whose axes are parallel to each other and to the axis of the work stock mounted on opposite sides of the stock and provided with counterpart helical ribs, the diameter of said ribs being a definite multiple of the diameter of the finished worm, and the number of ribs on each roll being the same as said multiple, and means for feeding said rolls toward each other while in engagement with the work while maintaining the parallel relation of the axes of the rolls and stock.

5. In a machine for rolling worms or the like wherein the work stock is rotatably supported, a rotatably mounted roll having a plurality of helical ribs arranged equidistant apart on the surface thereof, the pitch diameter of said ribs being a definite multiple of the pitch diameter of the worm to be formed.

6. In a machine for rolling worms or the like wherein the work stock is rotatably supported, rotatably mounted rolls disposed with their axes parallel to each other and to the axis of the work, said rolls having a plurality of helical ribs arranged equidistant apart on the surface thereof, the pitch diameter of said ribs being a definite multiple of the pitch diameter of the worm to be formed.

7. A worm rolling machine comprising rotatable formers disposed one above the other with their axes parallel to each other and to the axis of the work, hollow chucks adapted to receive the ends of a bar of plastic metal, split rings adapted to be inserted in the bores of said chucks to fill spaces between said bar and said chucks, whereby said bar is held between said formers so that rotation thereof is permitted and endwise movement or stretching thereof is prevented, means for rotating said formers at the same speed and means for bringing them closer together and spreading them apart while maintaining the velocity ratio and the parallel relation of said formers.

Signed at Winchester, New Hampshire, this 26th day of May, 1921.

GOUVERNEUR G. BROWNE.